United States Patent [19]

Donkervoort

[11] 4,413,797

[45] Nov. 8, 1983

[54] CLAMPING RING

[75] Inventor: Dorotheus Donkervoort, Vlaardingen, Netherlands

[73] Assignee: Eerste Nederlandse Fabriek van Manometers B.V., Netherlands

[21] Appl. No.: 244,114

[22] Filed: Mar. 16, 1981

[30] Foreign Application Priority Data

Jun. 3, 1980 [NL] Netherlands ............... 8003238

[51] Int. Cl.³ ................................. G12B 9/00
[52] U.S. Cl. ..................................... 248/27.1; 248/56
[58] Field of Search ................. 248/27.1, 56, 57; 403/194, 197; 285/205

[56] References Cited

U.S. PATENT DOCUMENTS 1,835,155 12/1931 Harbert .......................... 248/56
2,679,993 6/1954 Christophersen ............... 248/27.1

FOREIGN PATENT DOCUMENTS 494017 10/1938 United Kingdom ............... 248/27.1

Primary Examiner—James T. McCall
Assistant Examiner—David L. Talbott
Attorney, Agent, or Firm—Irvin A. Lavine

[57] ABSTRACT

An attachment means for an article disposed in a panel opening, which attachment means is provided with a ring which fits with clearance about the portion of the article projecting through the panel and which is fitted with circumferentially spaced clamping elements axially adjustable relative to the ring and operative adjacent the inner edge of the ring and with adjusting elements for defining the axial position of the clamping ring relative to the rear wall of the panel.

6 Claims, 3 Drawing Figures

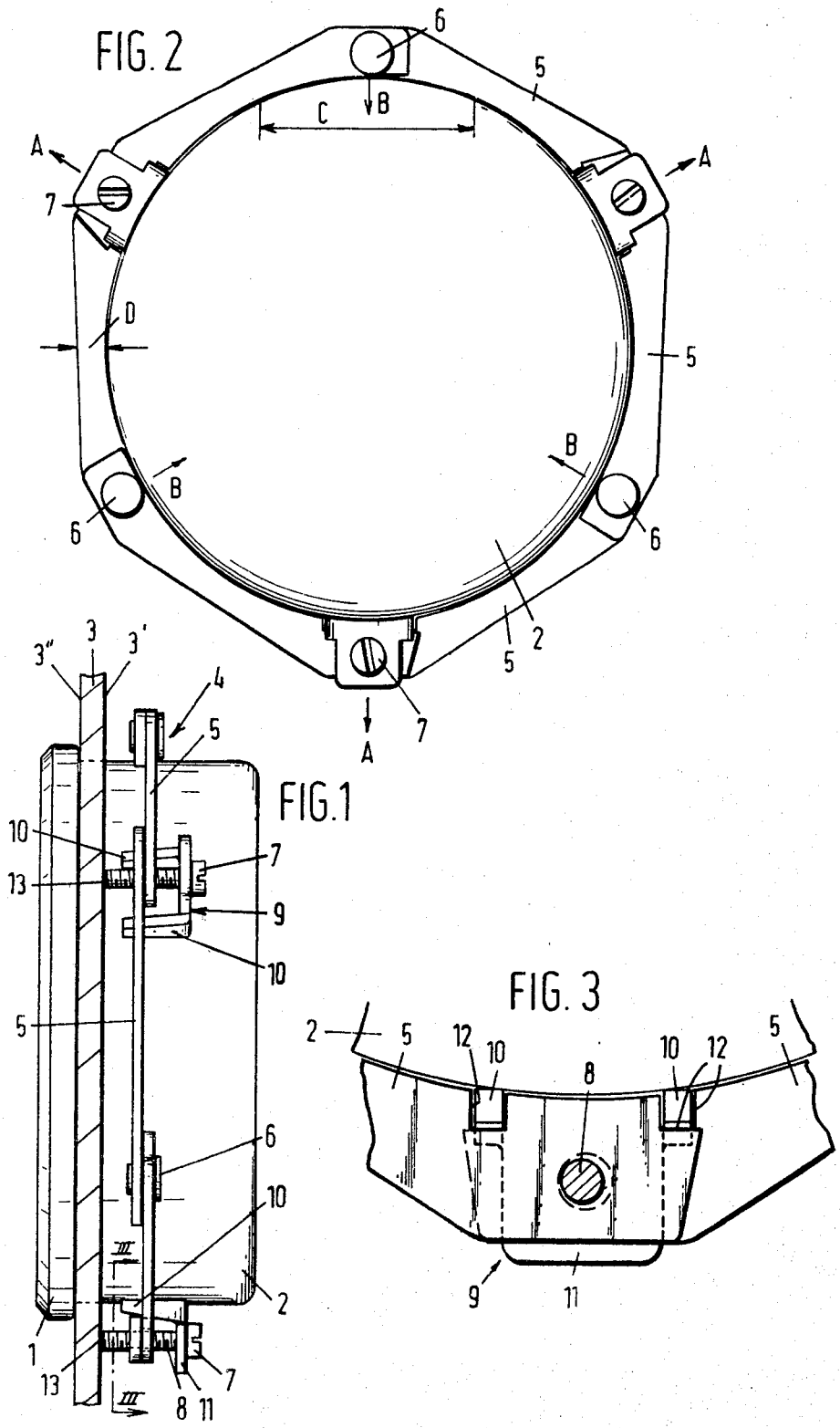

CLAMPING RING

The invention relates to an attachment means for an article recessed in a wall element, in particular an article projecting through an opening in a panel, said attachment means, through engagement on a part of the article projecting on the other side of the panel, in cooperation with stopping devices acting on the panel, being adapted to fix the article in a stationary axial position relative to the panel.

Although the invention is not strictly restricted thereto, the major field of application should be seen in the assembly of measuring instruments in panels, such as pressure gauges, thermometers, tachometers, hodometers and the like and in the following part of the specification reference will be made only to pressure gauges for convenience' sake.

A pressure gauge housing has the shape of a mostly cylindrical, flat box having at the front, window-side an edge which, in case of assembly of the pressure gauge in a panel, should come to rest flat against the front of the panel. However, pressure gauges allow a choice, depending on the place where the pressure gauge is used and the type of pressure gauge, between the self-supporting assembly of the pressure gauge via a connecting nipple on a part of a line system on the one end, and assembly on or a recessed position in a panel on the other end. In particular for accommodating a pressure gauge in a panel, it is known to make use of thread plugs, a counter-bracket engaging on the back side of the panel and (wing)nuts. The drawback of this attachment method is that the pressure gauge housing has to be fitted previously with thread plugs, at least provisions have to be made previously for the housing which are useless in case of self-supporting assembly on a line system. Consequently, making allowance for both attachment possibilities constitutes an uneconomical aspect of the pressure gauge manufacture.

It is the object of the invention to provide an attachment means through which the article can be mounted rapidly and reliably in a wall element in the above described manner without particular provisions having been made for an article to be attached. In case of pressure gauges, allowance has to be made for high line pressures, i.e. heavy lines which, connected to the thread of the pressure gauge, may not loosen the pressure gauge in operation as a result of vibrations.

To this effect according to the invention the attachment means is provided with a ring which fits with play about the article portion projecting through the panel and fitted with circumferentially spaced clamping elements adjustable axially relative to the ring and operative at the inner wall of the ring and having adjustment means for determining the axial position of the clamping ring relative to the rear wall of the panel.

By means of the clamping ring according to the invention the respective article can be simply mounted in an opening in a panel by pushing the article into the panel opening, pushing the clamping ring at the back over the article portion projecting in situ, while clamping the ring onto the portion and by pulling the article by means of the axial positioning means further backwards relative to the back wall of the panel.

A constructively simple embodiment of the clamping ring is characterized by threaded bolts coacting with screw holes in the ring, with which the clamping elements designed as wedge elements are axially coupled. By turning in the screws after positioning the ring over the article portion projecting behind the panel, the wedges operative at the inner edge of the ring are displaced axially relative to the ring face whereby portions of the ring are clamped onto the article, while the free ends of the threaded bolts bear on the back of the panel and as a result pull the clamping ring and the clamped article backwards relative to the panel. In case of a pressure gauge housing this edge extending about the window at the front and projecting radially from the housing may serve as stop relative to the front of the panel.

The clamping ring according to the invention may be undivided and be designed with a smaller bending stiffness in the ring zones between the clamping elements than at the clamping elements. Since, as a result of the wedge effect, the ring material at the wedges moves off radially from the engaged article, the engagement on the article in those places will be circumferentially between the respective wedges. By designing the intermediate ring zones, the zones between the clamping elements, with a relatively small bending stiffness, a relatively large arc surface of the inner edge of the ring will be clampingly bedded down against the opposite portion of the wall of the article.

In particular with articles of relatively large diameter, a reliable clamping of the article may be insufficient in spite of the reduced bending stiffness of the pertinent clamping ring portions and the deformations of these parts produced by the increased radius of curvature of the inner wall. In illustration thereof a pressure gauge housing may be thought of which in case of larger and heavier design should also be embraced more strongly in order to resist the vibrations produced in operation by the likewise heavier lines communicating therewith, which might lead to the loosening of the pressure gauge housing. Another drawback of the undivided ring design is that before the clamping force produced by the wedges in the intermediate portions can be exerted on the wall of the article to be clamped, the ring has first to be deformed, i.e. a part of the clamping force exerted is lost in the deformation of the ring.

These drawbacks are eliminated, in a further embodiment of the invention, by a divided design at least in the ring zones between the clamping means while pivotally interconnecting the ring portions in the ring face. Also at the wedges, the ring may be pivotal and in the zones positioned between the successive pivots of the ring may likewise be designed with a smaller bending stiffness than at the pivots, at the wedges.

One embodiment of the clamping ring according to the invention will now be described by way of example, with reference to the accompanying drawing, wherein FIG. 1 is a side view of an article mounted in a panel by means of the clamping ring according to the invention;

FIG. 2 is a top view of the ring; and

FIG. 3 is an enlarged detail view on the arrow III—III in FIG. 1.

According to the drawing an article, in the present case a pressure gauge having at the front side a ring edge 1 and at the back side a housing 2 in the form of a flat cylindrical box, is fixed in a panel 3 by means of a clamping ring 4 according to the invention.

The clamping ring 4 is composed of arc segments 5 which are interconnected by pivots 6, respectively in the form of threaded bolts 7, each received in a screw hole in one of the ring arc segments 5, while the adjoining ring arc segment 5 is adapted for swivelling movement about the shank 8 of the bolt 7, so that also at the bolts 7, the ring arc segments 5 meeting each other are capable of pivoting relatively to each other.

To each bolt 7 there is coupled axially a wedge element 9, comprising in the depicted embodiment two wedges 10, connected by a bridge 11; wedge element 9 is rotatable relative to the bolt 7, however, it can follow axial movements of the screw 7. The wedges 10 of the wedge element 11 project with clearance through corresponding recesses 12 in the ring segments 5, so that the ring segments have freedom for slight swivelling movements about the bolt shank 8 functioning as a pivot pin.

The free end 13 of the bolts each functions as a stop element adapted for coaction with the rear wall 3' of the panel 3. By tightening the bolts 7 in the situation shown in FIG. 1, the wedge elements 9 slide between the ring 4 and the pressure gauge housing 2 relative to the ring in the direction of the panel rear wall 3', so that simultaneously both the ring segments 5 are clamped about the pressure gauge housing 2 when the ring and the clamped pressure gauge housing are pushed away from the panel rear wall 3' until the ring 1 abuts against the front wall 3" of the panel, thus fixing the pressure gauge in the panel 3.

During the clamping of the ring 4 on the pressure gauge housing 2, the ring zones in the vicinity of the wedge elements 9 move away from the pressure gauge housing 2 in the arrow direction A and the intermediate zones, on either side adjoining the pivots 6, are moved radially inwardly according to the arrow direction B and the respective segments of the ring 4 can clampingly nestle against the pressure gauge housing 2, e.g. over an arc zone indicated by C. Since the pivots 6 allow conveniently the required ring deformation, the dimension of said zone C may be optimal, to which contributes that in the ring zones between the pivots the bending stiffness of the ring material is smaller than at the pivots 6, and at the screw and wedge assemblies 8, 9. This variation in bending stiffness can be obtained by selecting in said intermediate zones the radial dimension of the ring material, indicated by D, smaller than elsewhere.

By means of the clamping ring according to the invention in all its embodiments it is possible in a very simple manner to mount an article 1, 2 in a panel 3 by sliding the ring over the portion 2 of the article projecting from the rear side of the panel until the free ends 13 of the respective bolts 7 rest against the rear side 3' of the panel, after which the bolts 7 are tightened until the required clamping is achieved.

What I claim is:

1. An attachment means for an article recessed in a wall element, in particular an article projecting through a panel opening, said attachment means being adapted to fix the article in a stationary axial position relative to the panel by engagement on an article portion projecting from the other side of the panel, in coaction with stopping devices operative on the panel, characterized in that the attachment means comprises an undivided clamping ring which fits with clearance about the article portion projecting through the panel, circumferentially spaced clamping elements thereon adjustable axially relative to the ring and operative at the inner edge of the ring, and adjusting elements for defining the axial position of the clamping ring relative to the rear wall of the panel, said clamping ring comprising ring zones situated circumferentially between the clamping elements having a smaller bending stiffness than at the clamping elements.

2. The attachment means of claim 1, said ring comprising threaded holes, threaded bolts in said holes, said clamping elements journalled on said bolts and comprising wedge elements.

3. The attachment means of claim 1, said clamping ring at least between said clamping elements comprising ring segments, and means for pivotally connectng said ring segments.

4. The attachment means of claim 3, said ring having a smaller bending stiffness between said pivotal connecting means than at said pivotal connecting means and at said clamping means.

5. An attachment means for fixing an article in a panel, said article having a stop shoulder at the front of the panel and projecting through the panel with an at least locally cylindrical portion, characterized in that the attachment means is a clamping ring which is adapted to be pushed behind the panel onto the cylindrical portion of the article and is fitted with wedges spaced circumferentially of the ring, each wedge being axially coupled with a threaded bolt received in a threaded hole in the ring and the free end of which constitutes a stop adapted to coact with the rear wall of the panel, while the ring between the wedges has a smaller bending stiffness than adjacent the wedges.

6. A clamping ring according to claim 5, characterized in that at least 3 wedges are uniformly spaced in circumferential direction of the ring and the ring is composed of at least six mutually pivoting portions, with the pivot points at the wedges and halfway between the wedges.

* * * * *